(12) United States Patent
Sumi

(10) Patent No.: US 7,265,467 B2
(45) Date of Patent: Sep. 4, 2007

(54) FLUID DYNAMIC PRESSURE BEARING AND SPINDLE MOTOR

(75) Inventor: Shigeharu Sumi, Kyoto (JP)

(73) Assignee: Nidec Corporation, Kyoto (JP)

( * ) Notice: Subject to any disclaimer, the term of this patent is extended or adjusted under 35 U.S.C. 154(b) by 298 days.

(21) Appl. No.: 10/904,384

(22) Filed: Nov. 8, 2004

(65) Prior Publication Data

US 2006/0097592 A1 May 11, 2006

(30) Foreign Application Priority Data

Nov. 7, 2003 (JP) ............................. 2003-378667

(51) Int. Cl.
*H02K 5/16* (2006.01)
(52) U.S. Cl. ....................................................... 310/90
(58) Field of Classification Search ............... 310/90, 310/90.5; 384/112, 114
See application file for complete search history.

(56) References Cited

U.S. PATENT DOCUMENTS 5,822,846 A * 10/1998 Moritan et al. ............... 29/598

| | | | |
|---|---|---|---|
| 6,768,236 B2 * | 7/2004 | Tokunaga et al. | 310/90 |
| 7,005,768 B2 * | 2/2006 | Tamaoka et al. | 310/90 |
| 2004/0070298 A1 * | 4/2004 | Aiello et al. | 310/90 |

FOREIGN PATENT DOCUMENTS

| | | |
|---|---|---|
| JP | A-H07-75313 | 3/1995 |
| JP | U-H07-027269 | 5/1995 |
| JP | A-H08-331796 | 12/1996 |
| JP | A-H09-79272 | 3/1997 |

* cited by examiner

Primary Examiner—Dang Le
Assistant Examiner—Nguyen Hanh
(74) Attorney, Agent, or Firm—Judge & Murakami IP

(57) ABSTRACT

A fluid dynamic pressure bearing having a tapered seal part provided between a sleeve and a housing, from which lubricating liquid is injected and functions as a buffer of the lubricating liquid. An end part of a radial gap between the sleeve and a shaft body is a labyrinth filled with lubricating liquid. An opening periphery is covered with an oil repellent film to prevent outflow of the lubricating liquid. These features can make the size of the tapered seal part small in the axial direction. It enables a larger radial dynamic pressure bearing mechanism to be formed and, in particular, bearing rigidity in the radial direction can be increased.

9 Claims, 13 Drawing Sheets

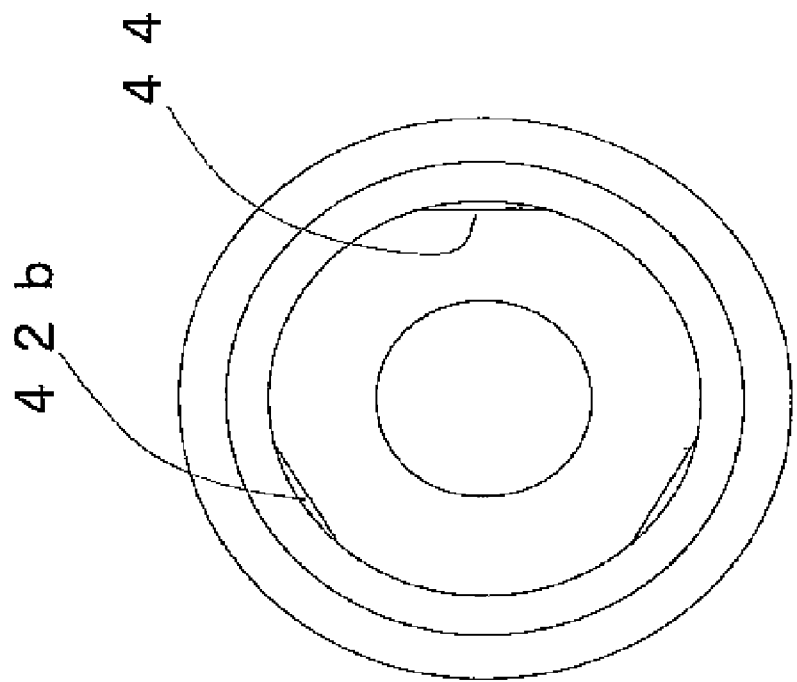
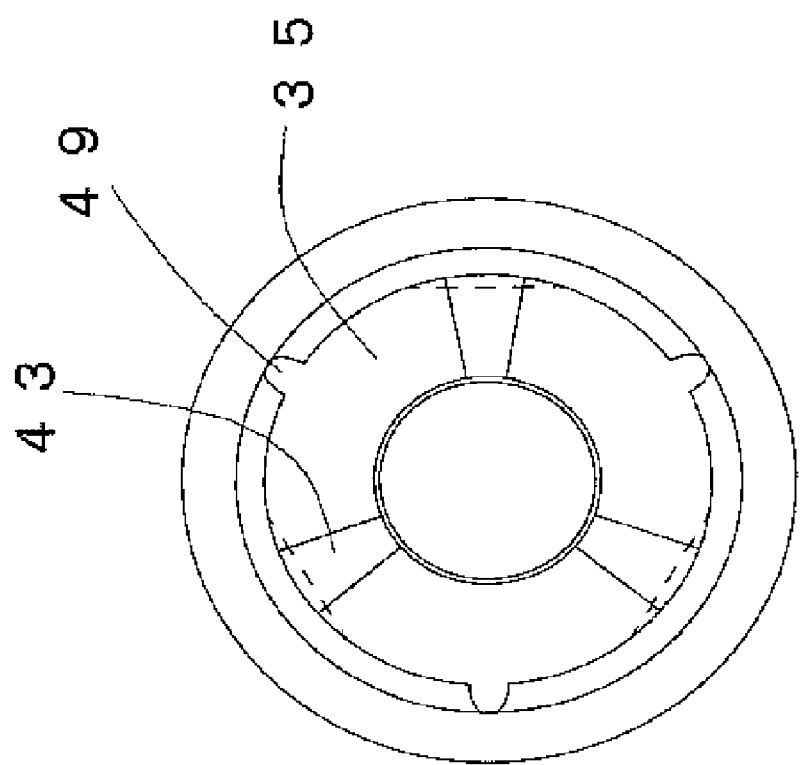
Fig.5 a)
Fig.5 b)

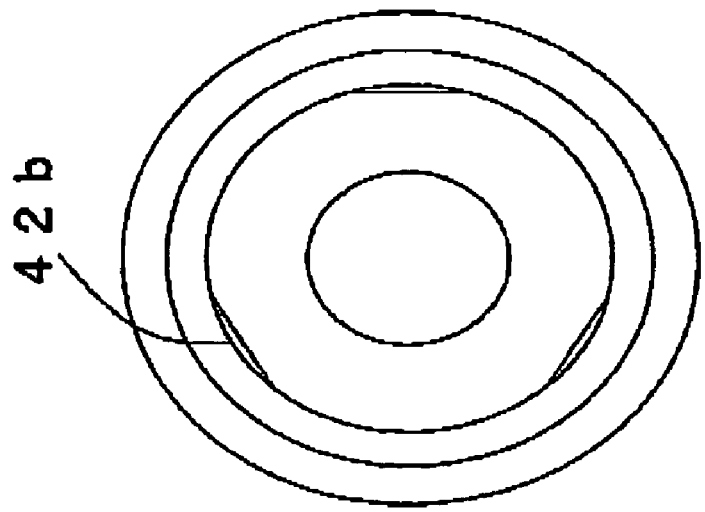
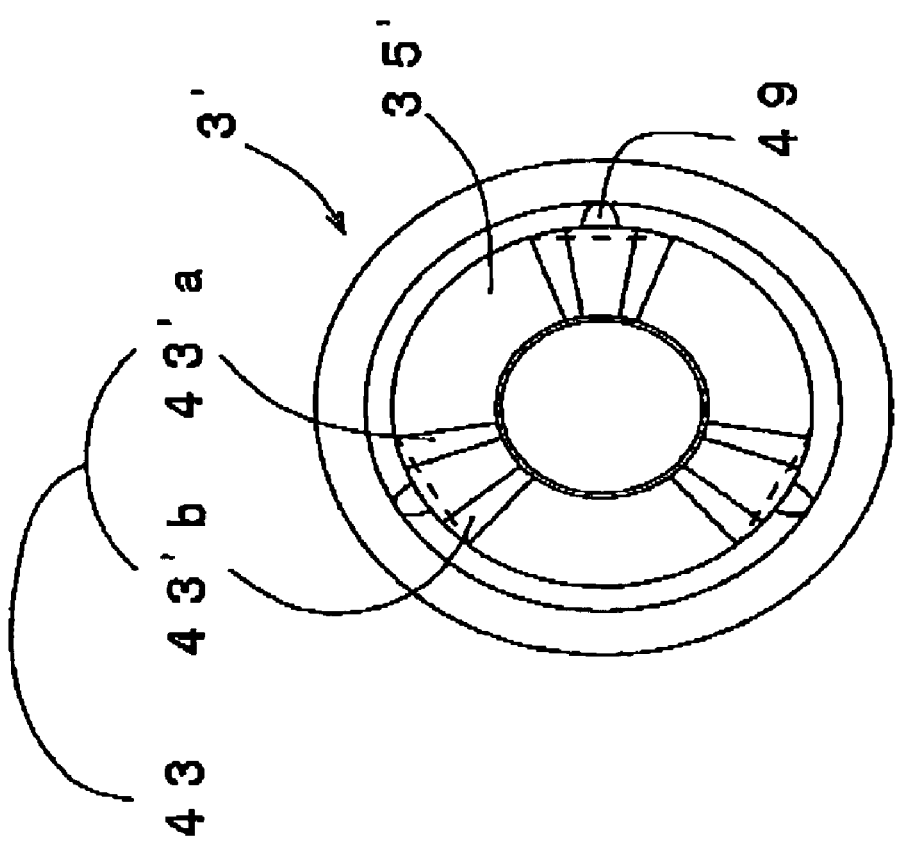

FLUID DYNAMIC PRESSURE BEARING AND SPINDLE MOTOR

FIELD OF THE INVENTION

The present invention relates to a bearing device that employs a fluid dynamic pressure bearing mechanism mounted on a signal recording reproducing device such as a hard disk driving device, and a spindle motor mounting the bearing device. In particular, it relates to a thin bearing device in which a bearing thereof is small in height and a thin spindle motor.

BACKGROUND ART

For a spindle motor used in a signal recording and reproducing device such as a hard disk drive, various fluid dynamic pressure bearings have conventionally been used. The fluid dynamic pressure bearing is a bearing in which a lubricating liquid such as oil is interposed between a shaft body and a sleeve and a fluid pressure generated in the lubricating liquid is used as a supporting force.

One example of a spindle motor using a conventional dynamic pressure bearing is illustrated in FIG. 13. In this spindle motor, a pair of radial dynamic pressure bearing mechanism 137, 137 are arranged away from each other in an axial direction between an outer peripheral surface of a shaft body 131 formed integrally with a rotor 105 and an inner peripheral surface of a sleeve 133 into which the shaft body 131 is inserted rotatably. In addition, a pair of thrust bearing mechanism 136, 136 are Conned between an upper surface of a disk-shaped thrust plate 134 protruded from an outer peripheral surface of one end part of the shaft body 131 outward in a radial direction and a step formed in the sleeve 133, and between a lower surface of the thrust plate 134 and a thrust bush 132 closing one opening of the sleeve 133, respectively. Above the radial dynamic pressure bearing mechanism, a tapered seal part 140 is formed into peripheral surface of the shaft body 131.

With respect to such a spindle motor, further reduction in thickness has been sought after. It is because demand for compact information equipment has been increased, and according to this, miniaturization and reduction in thickness have also been sought after with respect to a hard disk drive or the like.

However, in the case where the spindle motor as shown in FIG. 13 is made thin, the height of a fluid dynamic pressure bearing device is inevitably imposed strict limitation on. Therefore, a span between to two radial dynamic pressure bearing mechanisms cannot help being reduced. This, in particular, reduces resistance to an external force trying to collapse the shaft body (rigidity), thereby making the design of bearing extremely difficult. A thin fluid dynamic pressure bearing device with strong bearing rigidity or a thin spindle motor with excellent performance has been sought after.

SUMMARY OF THE INVENTION

In a bearing device of the present invention, the long tapered seal which has conventionally been formed along the peripheral surface of the shaft body, as shown FIG. 13, is removed, and the lubricating liquid is supported by a second interface formed at a bearing cavity end part. Unlike the conventional structure, a long seal structure along the shaft does not need to be provided. Therefore, a radial dynamic pressure bearing mechanism can be formed up to an end of the shaft body.

Change in volume of the lubricating liquid due to thermal expansion or the like or a decrease in the lubricating liquid due to evaporation is absorbed in the tapered seal formed on the side of a stationary part of the bearing device (a first tapered seal part). Since this tapered seal is formed in a side surface, a height of the bearing is not increased.

The second interface is formed between the stationary part and the shaft body and is exposed to strong stress during rotation of the shaft body. However, since a width of the interface is designed to be narrow, the interface is stable.

Both of an opening part of the first tapered seal and the second interface are located on one end side of the bearing. Therefore, influence of evaporation of the lubricating liquid or leakage of the lubricating liquid by applying strong impact is limited to the one end part side of the bearing device. This property is preferable for a spindle motor for hard disk which particularly requires cleanness.

In the bearing device of the present invention, the stationary part can be structured such that the sleeve is fitted into the housing. This makes it easy that the housing and a radial bearing surface are made of different materials. Furthermore, this makes it easy to form the first tapered seal part in the sleeve side surface.

In the bearing device of the present invention, by attaching a cover member to the stationary part, a connecting path from an end part of the radial bearing clearance to the side surface of the sleeve can be easily formed. In the case where the tapered seal is provided in the sleeve side surface, this structure is particularly useful to connect the first tapered seal part with the radial bearing gap.

In the bearing device of the present invention, by further providing a peripheral wall in the cover member, the attachment of the cover member becomes easy and secure. In addition, the use of the peripheral wall makes it easy to form the connecting path and a communicating path in the side surface of the sleeve.

In the bearing device of the present invention, further, a second tapered seal part or chamfer may be provided in a radial gap end part in which the second interface is formed. In the bearing of the present invention, a vicinity of the second interface is an oil repellent region, which prevents the leakage of the lubricating liquid. However, there is a possibility that as the bearing is used in the long term, deterioration in oil-repelling ability in the oil repellent region occurs. Furthermore, there is a possibility that strong vibration, impact or the like disturbs the interface. Providing the second tapered seal part and the chamfer can stabilize this second interface.

When the second tapered seal part is provided, a taper angle (hereinafter, a second taper angle) is set to be larger than a taper angle of the first tapered seal part (hereinafter, a first taper angle). This can makes a width of the second interface smaller than that of the first interface. This second taper angle is preferably twice or more the first tapered angle.

In the case where a chamfered part is formed in the radial gap end part, if the part is too large, a length in the axial direction is large, which increases the height of the bearing device. If too small, the effect is slight. Thus, for a lower limit of a chamfer amount, a curvature of the second interface is rationally used as a measure. The upper limit is set to a width of the first interface.

In the case where the chamfered part is formed, it is desirable that oil-repelling property is given to half on the side far from the beating clearance. This is because that for preventing the lubricating liquid from flowing out from an opening end edge, it is desirable that the lubricating liquid is repelled back on a chamfered part surface into the clearances. On the other hand, inside of the bearing clearance, the surfaces composing the clearance desirably have oil-attracting property. FIG. 1 is an exemplary cross-sectional view of a second interface. In the vicinity of the second interface 51, the oil-repelling region is formed (denoted by double lines on a surface of a shaft 31 and a sleeve). When the oil-repellent region extends into the clearance, as shown in FIG. 1b), the interface warps smaller and is unstable. When the surfaces have oil-attracting property, as shown in FIG. 1a), the interface becomes stable. An effect of preventing air from entering the lubricating liquid filling the bearing clearance can be expected. "Oil-repelling property" in the present specification means that the contact angle of the lubricating liquid is larger than 45 degree. More preferably, this is 90 degree or larger.

In the bearing device of the present invention, a radial dynamic pressure bearing mechanism adjacent to the second interface can function so as to increase a pressure of the lubricating liquid in a direction away from the second interface. In this case, since a force pushing the second interface toward the outside is not applied, the interface is stabilized. Furthermore, circulation of the lubricating liquid inside of the bearing is induced.

In the bearing device of the present invention, there can be a clearance in a certain area between the inner surface of the housing and the outer surface of the sleeve. The area is extending in axial direction and the clearance of the area may be a part of the communicating path connecting a bottom part and an upper part of the bearing device. By forming a concave part extending in the axial direction in the side surface of the sleeve or the inner peripheral surface of the housing, a flow path extending in the axial direction can be formed. Furthermore, by providing a concave part or a groove extending in a radial direction in a bottom surface inside of the housing or a lower end surface of the sleeve, a flow path spreading in the radial direction can be formed. By leaving a clearance in the bottom part when the sleeve is fitted into the housing, the flow path in the radial direction may be formed.

The connecting path connecting the first tapered seal part and the radial gap can be the communicating path connecting the upper part and the lower part of one radial gap by combining the above-mentioned flow paths.

In the bearing device of the present invention, a thrust bearing mechanism may be further provided. Support in a thrust direction is stabilized.

In the bearing device of the present invention, the sleeve may be made of porous materials such as oil-impregnated sintered metal material. Since the porous body can store a large amount of lubricating liquid, a retaining amount of the lubricating liquid in the bearing device is increased, so that depletion of the lubricating liquid due to evaporation or the like hardly occurs, and the bearing device with a long life can be attained. In addition, since the porous body can trap abrasion powders or the like generated in the bearing clearance, their harm can be alleviated.

BRIEF DESCRIPTION OF DRAWINGS

FIG. 5 is a top view of the bearing device.

FIG. 8 shows Modification 1 of the bearing device.

FIG. 12b) is a view corresponding to FIG. 11b). representing in detail a second seal part of the bearing device in this other embodiment.

DETAILED DESCRIPTION

Preferred embodiments for carrying out a bearing device and a spindle motor according to the present invention are described as Embodiments 1 to 5.

EMBODIMENT 1

1-1 Description of Spindle Motor

Figure 1:
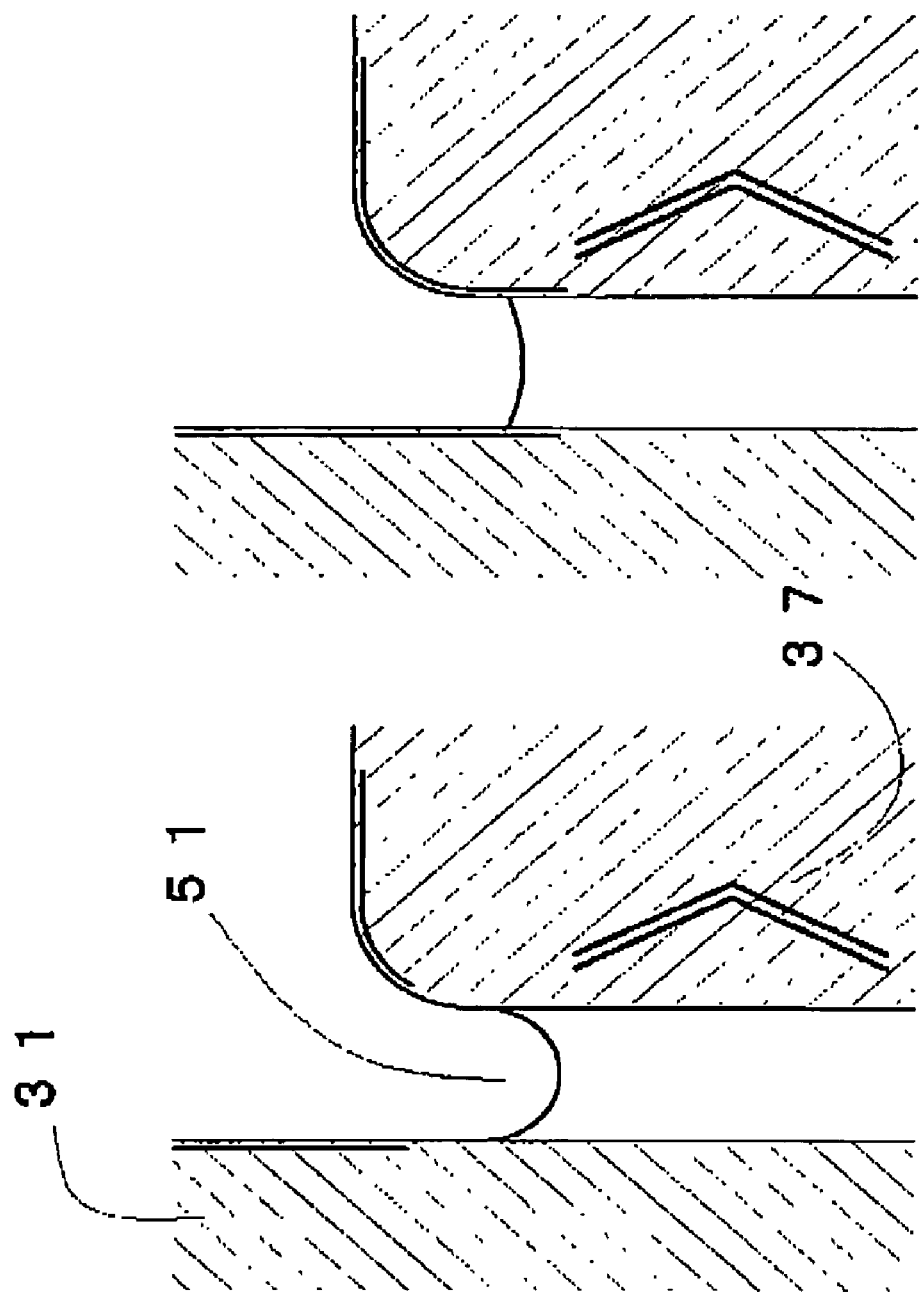
FIG. 1 is an exemplary cross-sectional view of a second interface and radial dynamic pressure grooves of the bearing device.
Figure 2:
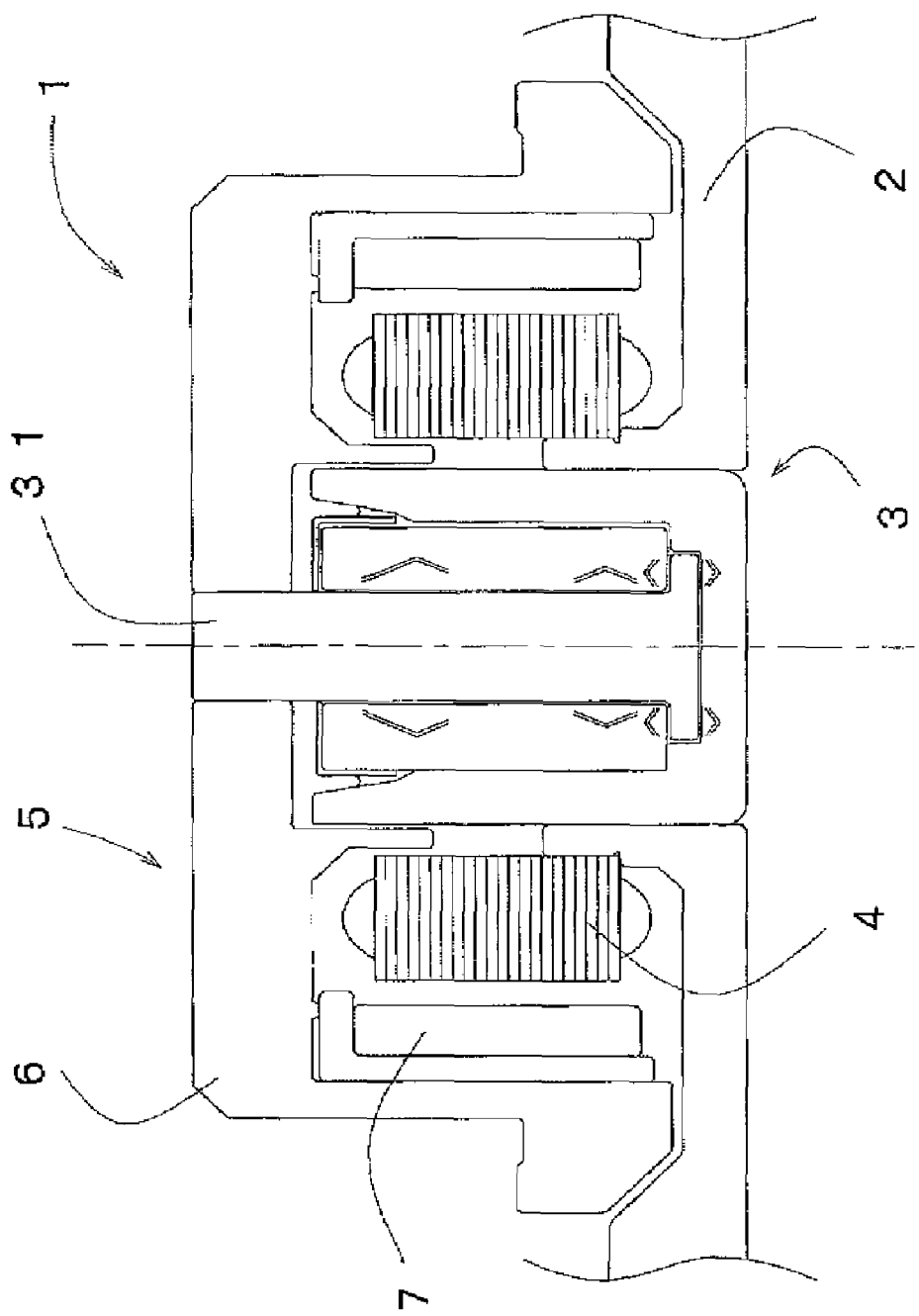
FIG. 2 is an exemplary cross-sectional view of a spindle motor 1 according to the present invention.

FIG. 2 is an exemplary cross-sectional view of a spindle motor 1 according to the present invention. The spindle motor 1 is assembled from a bearing device 3 according to the present invention, which is attached to a base 2, a stator 4 set on the base plate 2 surrounding the bearing device 3, and a rotor 5 attached to one end of a shaft body 31. The rotor 5 is assembled from a hub 6 and a rotor magnet 7, and the rotor magnet 7 is attached to an inner peripheral surface of a cylindrical part of the hub 6 to have a positional relationship opposed to a magnetic pole of the stator 4. By energizing this stator 4, a rotary drive force is generated. The spindle motor 1 is attached to a case of a hard disk drive or the like via the base 2.

1-2 Entire Structure of Bearing Device

FIG. 3a) is an exemplary cross-sectional view of the bearing device 3 and FIG. 3b) is a perspective view thereof.

The bearing device 3 has a stationary part constructed by a substantially cylindrical sleeve 33 and a cylindrical housing 32 with a bottom which houses the same, and a shaft body 31 included in the sleeve 33 as main components. The inside of the sleeve 33 is a bearing cavity.

In a lower end part of the shaft body 31 in the figure, a thrust plate 34 is formed so as to be opposed to a lower end surface of the sleeve 33 at an upper surface thereof. Although, in FIG. 3, a step 41 is formed in a bottom surface of a housing inner periphery to house this thrust plate 34, such a step 41 is not required in the case where an outer diameter of the thrust plate 34 and an outer diameter of the sleeve 33 are almost the same.

1-3 Lubricating Liquid and Communicating Path

A minute radial gap 91 is formed between an outer peripheral surface of the shaft body 31 and an inner peripheral surface of the sleeve 33. Similarly, a second clearance is also held between the thrust plate 34, and the inner peripheral surface of the housing 32, and a lower end surface of the sleeve 33. These bearing clearances are filled with a lubricating liquid without interruption. In addition, a lower part and an upper part of the radial gap are communicated by a communicating path 42 described later.

A cover member 35 is fitted in an upper end side of the sleeve 33. Between an outer peripheral side surface of the cover member 35 and the inner peripheral surface of the housing 32, a tapered seal 40 in which a clearance is enlarged toward an opening end of the housing is formed. Furthermore, the cover member 35 has convex parts 43 formed by press and extending in a radial direction, and a clearance secured between each of concave parts on its back side and an upper end surface of the sleeve 33 is a connecting path 42a of the lubricating liquid. Furthermore, this connecting path 42a makes up a part of the communicating path 42.

Figure 4:
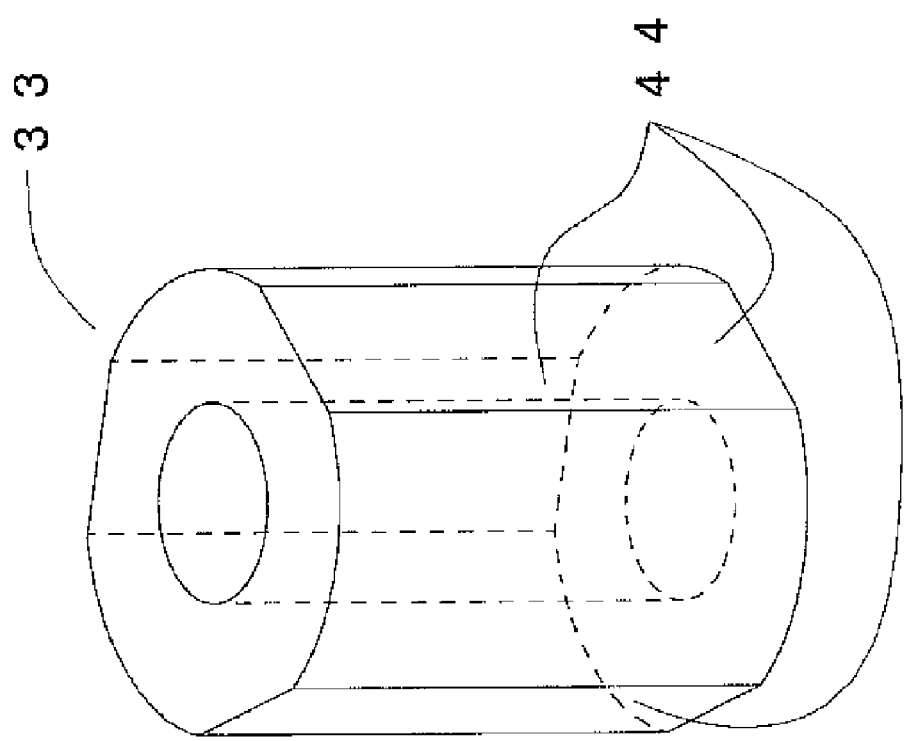
FIG. 4 is a perspective view of a sleeve.

On a side surface of the sleeve 33, flat areas 44 extending in an axial direction are formed at three positions (FIG. 4). Although these flat areas 44 are apparently flat, they constitute concave parts because a distance from the central axis of the sleeve is the smallest in a central part thereof. By fitting the sleeve into the housing, each of them makes into a part of the communicating path 42b.

Figure 3:
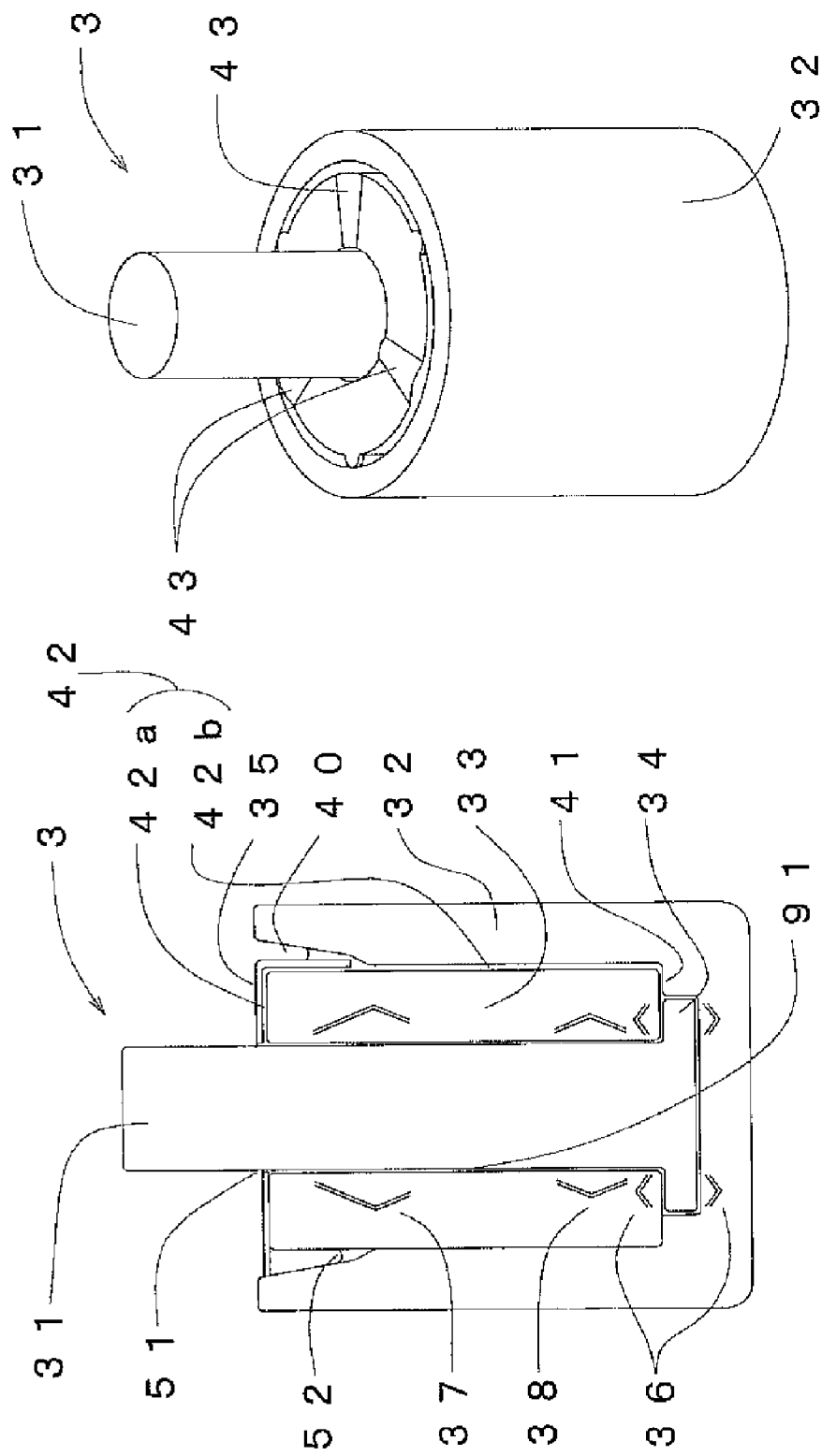
FIG. 3a) is an exemplary cross-sectional view of a bearing device and FIG. 3b) is a perspective view of the same.

FIG. 5a) shows a view when the bearing device 3 is looked down from the upper side of FIG. 3. FIG. 5b) shows a state before the cover member 35 is attached. Dashed lines in FIG. 5a) indicate the locations of the flat areas 44 of the sleeve 33. Each end on the radially outer side of the convex parts 43 is located above the flat part 44, and the connecting path 42a and the part of the communicating path 42b are connected here to compose one communicating path 42. The communicating path 42 is filled with the lubricating liquid as in the bearing clearance, which enables the lubricating liquid to come and go between the upper and lower parts of the radial gap.

As shown in FIG. 3a), in the case where the step 41 is formed in the housing bottom part, the communicating path 42b formed in the sleeve 33 side surface is closed at the step 41. In order to avoid this, a concave part is provided on an upper surface of the step 41 to connect the communication path 42b and the bearing clearance at a position corresponding to a lower end of the communicating path 42b.

In the upper surface of the cover member 35, a hole 46 for the shaft body 31 to penetrate is formed. A minute clearance is kept between an inner peripheral surface of this hole and the peripheral surface of the shaft body 31, and at this point, a second interface 51 is formed. The tapered seal 40 is connected to the communicating path 42 at a lower end edge of the cover member 35. The first tapered seal part is filled with the lubricating liquid up to the middle thereof to form a first interface 52. An oil repellent agent composed of a fluorocarbon resin is applied to the shaft body outer peripheral surface and the surface of the cover member 35 which are adjacent to the second interface to form an oil repellent region.

In this bearing device 3, the lubricating liquid filling the clearance between the outer peripheral surface of the shaft body 31 and the inner peripheral surface of the sleeve 33 is not in contact with ambient air at other than these first and second interfaces.

1-4 Dynamic Pressure Bearing

In FIG. 3, in the cylindrical inner peripheral surface of the sleeve 33, two sets of dynamic pressure generating grooves 37, 38 are formed at two positions apart in the axial direction to make up radial dynamic pressure bearing mechanisms, respectively. Each of these dynamic pressure generating grooves is composed of two parts. One of the two acts so as to increase a pressure of the lubricating liquid in downward direction, and the other acts so as to increase a pressure of it in upward direction, during rotation of the shaft body 31. The former part is located at upper side of the latter and high dynamic pressure is generated between them. The high dynamic pressure supports the shaft body 31.

In the figure, a double line drawn obliquely with respect to the bearing surface indicates the existence of the dynamic pressure generating groove, and means that the pressure of the lubricating liquid is increased toward the side on which the double line is away from the bearing surface. The double line in the figure is cornered, and is farthest from the bearing surface at the corner, which indicates that at this portion, the highest pressure is generated.

Out of the two set of radial dynamic pressure generating grooves 37 and 38, 37 located on the upper side is not symmetric vertically, but the portion increasing the pressure downward is formed to be larger. Therefore, the dynamic pressure generating grooves 37 acts so as to push the lubricating liquid downward of the bearing, while it generates a shaft supporting force in the radial direction. The other set of radial dynamic pressure generating grooves 38 is symmetric and two set of thrust dynamic pressure generating grooves 36, 36 are structured to be symmetric in the radial direction.

In the entire dynamic pressure generating grooves, the radial dynamic pressure generating grooves 37 generates a flow of lubricating liquid in which the lubricating liquid flows downward through the radial gap and flows through the communicating path 42 back to a vicinity of the second interface 51 which is the upper end part of the radial bearing surface. This flow inhibits leakage of the lubricating liquid from the second interface 51. Furthermore, it helps air bubbles or the like generated inside of the bearing to be discharged to the outside of the bearing via the communicating path 42 and the tapered seal 40.

1-5 Manufacturing Method

Figure 6:
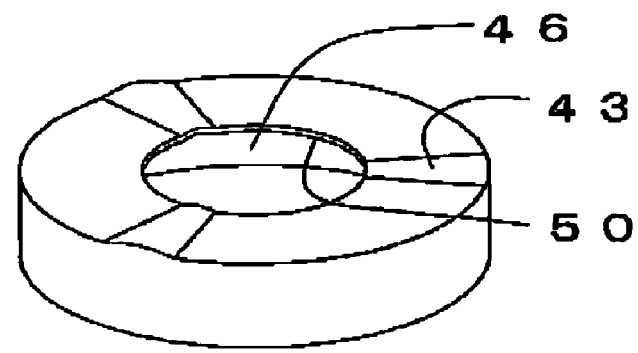
FIG. 6 is an explanatory view of a manufacturing process of a cover member.
Figure 6:
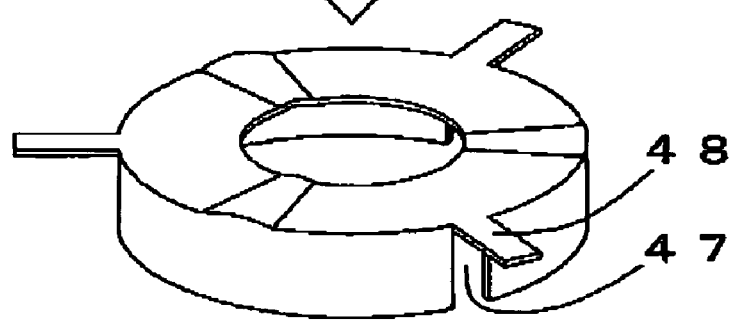
Figure 6:
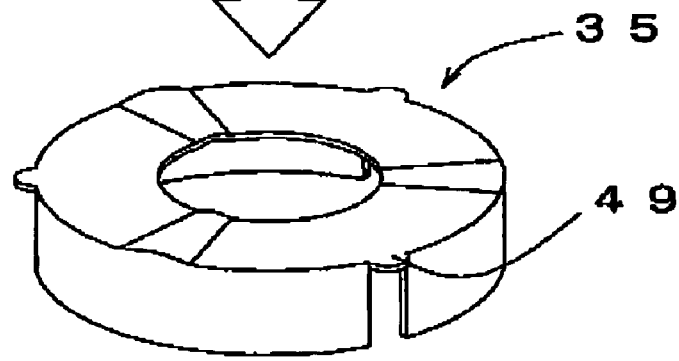
Figure 7:
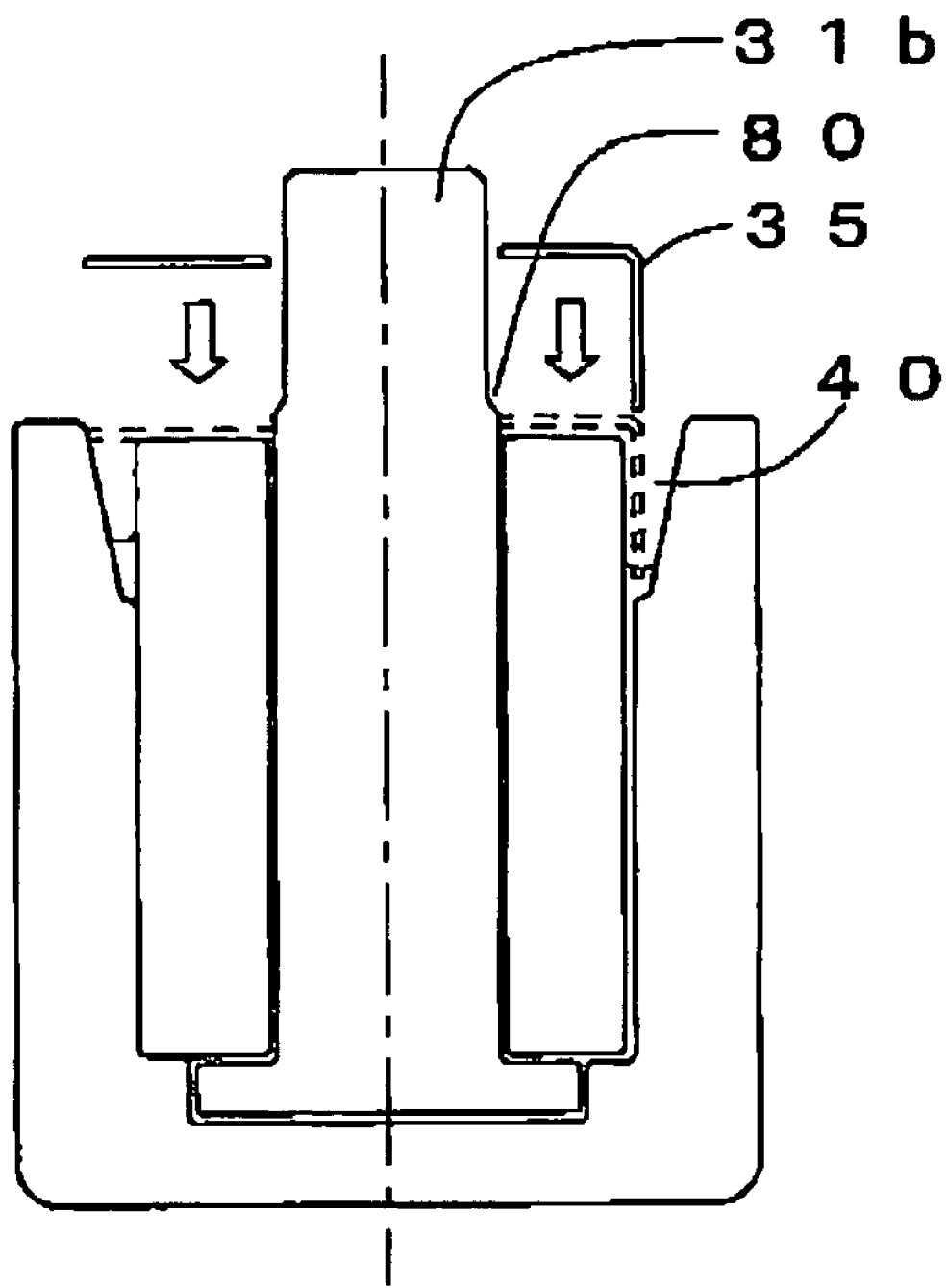
FIG. 7 is an explanatory view of a method for attaching the cover member.

The covering member 35 and a method for attaching the same are described referring to FIGS. 6 and 7.

FIG. 6 shows an example of a manufacturing process of the cover member 35. Firstly, a metal plate member or a thermoplastic plate is formed into a cylindrical shape with a lid by punching and press, and the hole 46 is punched out in the center of a lid part. At the same time, by press, the convex parts 43 extending in the radial direction are formed in the lid part (FIG. 6a).

Next, three cuts extending in the axial direction are made in a side peripheral surface of the member at each of positions shifting from the convex parts by 60 degree with respect to a central axis of the cover member. A member 48 between the cuts is lifted horizontally to form a slit 47 (FIG. 6b).

The member 48 is cut into such a length as to be brought into contact with the housing inner peripheral surface to be shaped and make into a connection part 49 (FIG. 6c).

After machining is finished, the oil repellent agent is applied to a periphery of the hole 46 of the lid part to give oil repellent property. At this time, attention should be paid so that the oil repellent agent does not come to the inner peripheral surface of the hole and the backside of the lid part (on the side in contact with the sleeve).

The cover member 35 is welded and fixed to the housing at a tip end part of this connection part 49. As a welding method, directional beam welding such as laser welding and electron beam welding is suitable. Furthermore, fixing by adhesion may be performed instead of welding. Furthermore, as still further another method, the cylindrical part of the cover member 35 may be lightly press-fitted onto the sleeve 33 and fixed.

For injection of the lubricating liquid into the bearing device, the lubricating liquid may be dropped into the first tapered seal part after welding the cover member 35 to spread inside of the bearing, while the cover member 35 may be welded after dropping the lubricating liquid (FIG. 7)

Since the bearing device of the present invention has the interfaces between the lubricating liquid and ambient air at two positions, replacement of the lubricating liquid and the air in the bearing clearance is comparatively smooth during injection of the lubricating liquid, which hardly causes injection failure. However, in the case where the lubricating liquid is injected after the cover member 35 is attached, a percentage of the injection failure can be higher.

In the case where the lubricating liquid is dropped into the first tapered seal 40 after the cover member 35 is attached, the lubricating liquid diverges in two directions and spreads inside of the bearing device. Firstly, there is a route in which it passes through the part of the communicating path 42*b* and reaches a periphery of the thrust plate 34 in the lower part of the bearing, and then spreads toward the upper part of the bearing through the radial gap where the radial dynamic pressure bearing mechanism is formed. The other is a route in which the lubricating liquid passes through the connecting path 42*a* formed between the cover member 35 and the sleeve 33, reaches the upper part of the radial gap, and fills the clearance between an inner peripheral surface 50 of the hole 46 of the cover member and the outer peripheral surface of the shaft body 31 to form the second interface.

As compared the former and the latter, the latter proceeds faster. Therefore, the second interface is formed before air inside of the bearing is sufficiently discharged and an escape route of the air is closed, so that air bubbles may be left inside of the bearing. In contrast, as shown in FIG. 7, in the case where the cover member 35 is attached after injecting the lubricating liquid into the bearing device, such a trouble does not occur.

In a shaft body 31*b* of the bearing device in FIG. 87, a part projected from the bole 46 of the cover member 35 is slightly reduced in diameter. When attaching the cover member, the outer peripheral surface of the shaft body and the inner peripheral surface 50 of the hole 46 are hardly brought into contact with each other The diameter of the shaft body is smaller than that of the hole without the reduction. But the difference of the diameters is small and the inner peripheral surface 50 or the like might be damaged during attaching working of the cover member. The trouble can be avoided with partly reducing the diameter of the shaft body. The diameter reduced part does not need to be continued over all the region from the shaft body end part to a vicinity of the opening of the hole, but even when it ends at a position slightly away from the opening, the effect of preventing damage can be attained. However, as shown in FIG. 7, when an inclined part 80 is provided in the vicinity of the opening, in case the oil repellent film in the vicinity of the opening is lost and the lubricating liquid leaks out, the leakage of the lubricating liquid can be inhibited to be small, because an angle of a wall surface supporting the interface is large.

Although when the cover member is welded and fixed after injecting the lubricating liquid, in particular, change of properties of the lubricating liquid due to heat and adverse influences on the dynamic pressure bearing surface due to thermal expansion or the like are concerns, the structure of the present invention does not cause the problems.

Firstly, most heat applied during welding is dissipated in the housing part with a large heat capacity, and thus, the lubricating liquid in the first tapered seal part 40 is hardly heated. With regard to the lubricating liquid between the cover member 35 and the sleeve 33, since the connection part 49 is small, heat transmitted to the cover member is small, thereby causing no trouble. Influence on the dynamic pressure bearing surface can be ignored because the welding part is far away from the bearing surface.

1-6 Material

For a material constructing the bearing device described in this embodiment, basically, any one that has required strength and rigidity can be selected. Since a metal material generally has sufficient strength, rigidity, and affinity to lubricating liquid, it is preferable as the material constructing the bearing device of the present invention.

In the bearing device described in this Embodiment 1, for the housing, aluminum based alloy is used as a material. For the sleeve, free-machining stainless steel is used, and after machining, intervening substance is removed by surface chemical treatment. Furthermore, the shaft body is made of martensitic stainless steel, and the cover member is made of copper alloy or synthetic resin material. Among synthetic resin materials, liquid crystal polymer is particularly suitable to form a fine structure. Treatment for increasing attractiveness may be applied to the inner peripheral surface 50 of the hole 46 of the cover member 35 as needed.

For the oil repellent film applied in the vicinity of the second interface opening, perfluoro resin is used. Furthermore, for the lubricating liquid, an ester based compound is used as a base oil.

The selection for these materials is basically the same in Embodiment 2 and the other embodiments.

EMBODIMENT 2

Figure 9:
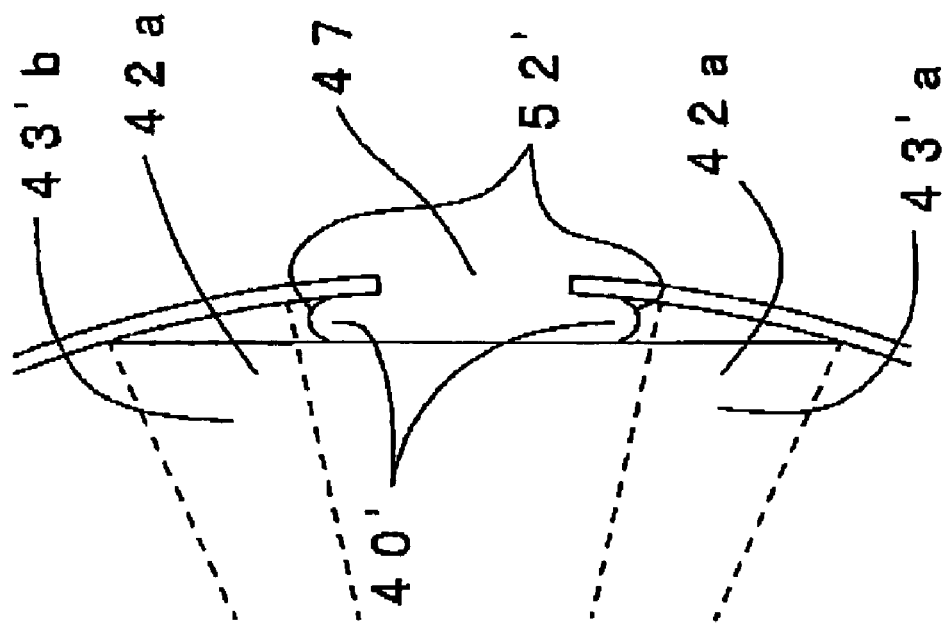
FIG. 9 is an explanatory view of the modification of the cover member.
Figure 9:
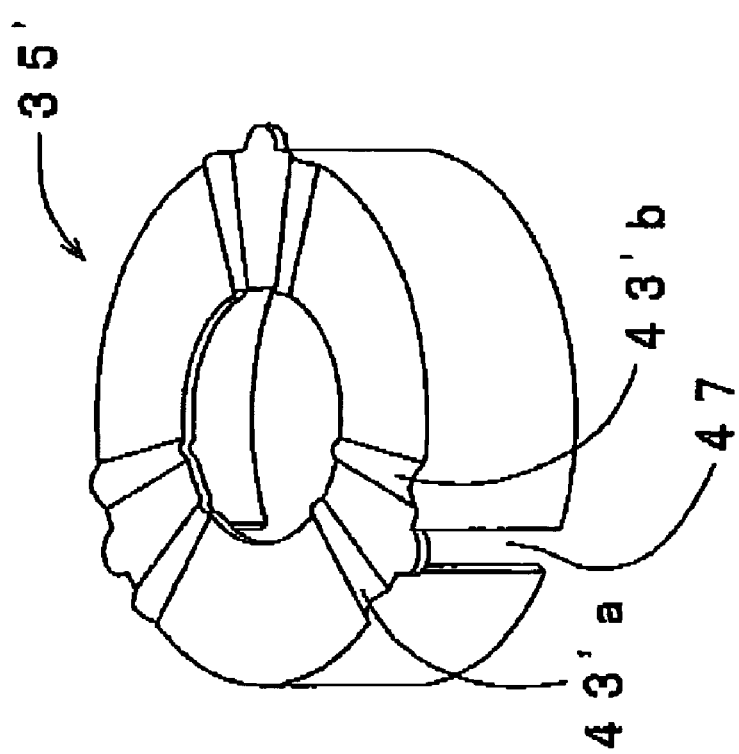

In reference to FIGS. 8 and 9, a modification 3' of the bearing device 3 is described. FIG. 8*a*) is a view in which a bearing device 3' is looked down from the upper side of the bearing. FIG. 8*b*) further shows a state before the cover member 35' is attached.

Unlike the bearing device 3, the connection part 49 is located directly above the flat part 44 of the sleeve 33. In addition, a convex part 43' is separated into two, that is, 43'*a* and 43'*b*, between which the connection part 49 is formed.

FIG. 9*a*) is a perspective view of this cover member 35'. Since this is formed in a method similar to the cover member 35, the slit 47 formed with the connection part 49 is also located between the two convex parts 43'*a* and 43'*b*, and extends in the axial direction FIG. 9*b*) is an enlarged view of a part of the first interface, and is a cross-sectional view in a surface perpendicular to the axis line direction that includes the cover member 35'. In this case, the additional tapered seal part 40' is formed between an inner peripheral surface of the cover member and the outer peripheral surface of the sleeve, other than the first tapered seal part 40. A part of the first interface 52' appears at the additional tapered seal part 40'.

The lubricating liquid circulating inside of the bearing flows from a part with a narrow width of this tapered seal 40' into the connecting path 42*a* and flows back to the upper part of the bearing. Even if air bubbles are contained in the lubricating liquid, it is difficult for the air bubbles to intrude the region of the additional tapered seal part where the width is narrow. So the air bubbles are shoved to the interface 52' side located in the additional tapered seal part 40' and discharged through the slit 47. In this manner, since the first tapered seal part 40' functions as an efficient sieve separating the air bubbles in the lubricating liquid, this bearing device 3' can discharge the air bubbles in the lubricating liquid extremely efficiently.

EMBODIMENT 3

Figure 10:
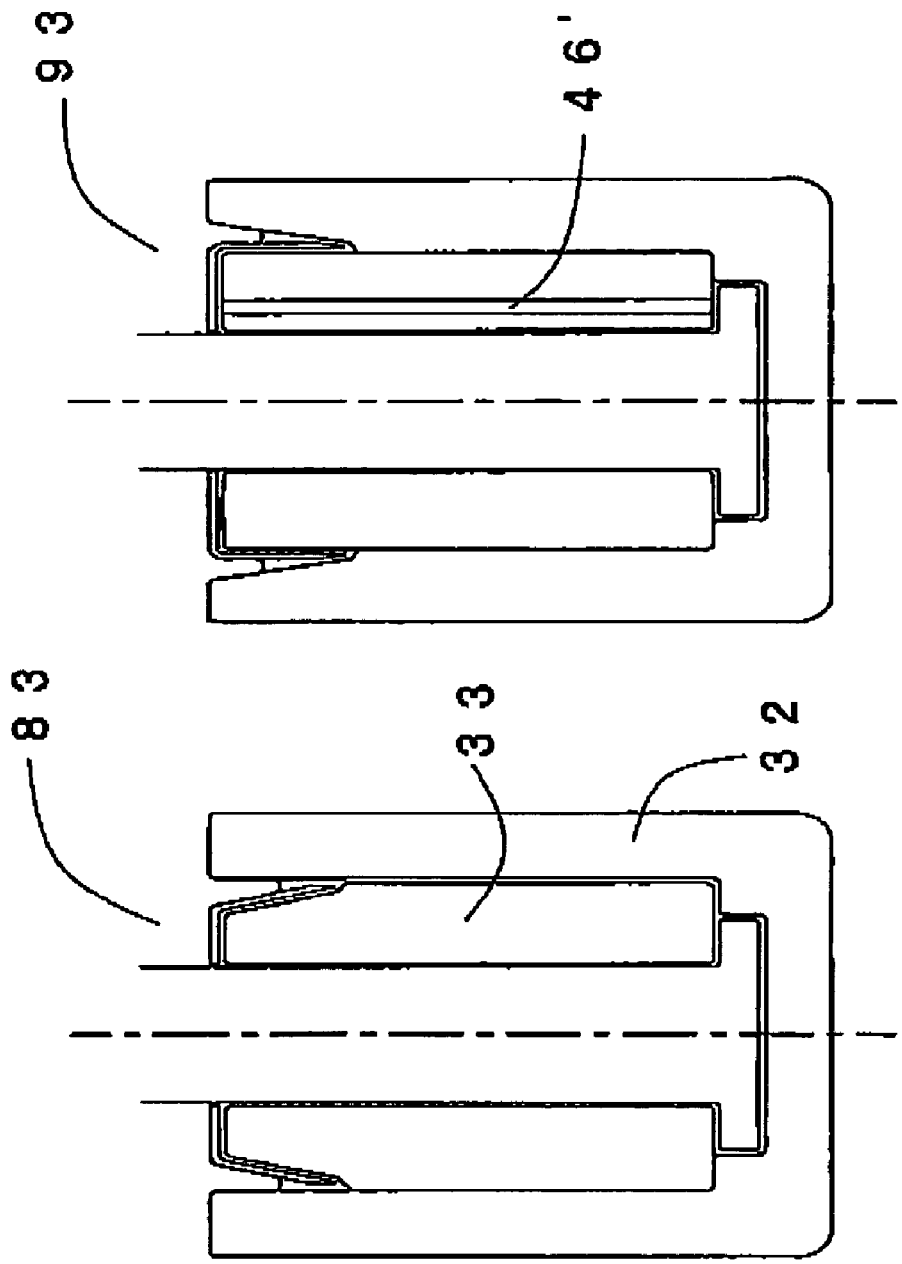
FIG. 10 shows second and third modifications of the bearing device.

Other modifications 83, 93 of the bearing device 3 are described in reference to FIGS. 10a) and 10b).

In FIG. 10a) by reducing an external diameter of one end part of a sleeve 33', the first tapered seal part is formed without forming the tapered part in an inner periphery of a housing 32'. In this case, for the sleeve 33', a copper based porous sintered body is used and the tapered shape is formed simultaneously when the powder material is pressed to be shaped into a cylindrical form. The tapered part does not need to be formed by machine cutting, which reduces processing costs.

In FIG. 10b), a communicating path 42' is formed by opening a through hole in the axial direction in the sleeve 33. Since the length of circulation root of the lubricating liquid becomes short, the circulation of the lubricating liquid becomes faster. Thereby the performance of the bearing becomes stabilized.

EMBODIMENT 4

A modification 73 of the bearing device 3 is described in reference to FIGS. 11a), 11b), 11c).

FIG. 11a) is a cross-sectional view in the axial direction of the bearing device 73, and in particular, a portion including a cover member 35b, the second interface 51 and the first interface 52 is enlarged to be shown. FIGS. 11b) and 11c) are views in each of which the vicinity of the second interface 51 and the first interface 52 is enlarged.

The cover member 35b is chamfered at a side surface of the inner peripheral surface of the hole. The side surface is opposed to the outer peripheral surface of the shaft body 31 to thereby form a second tapered seal part 39. A taper angle theta a of the second tapered seal part 39 is 34 degree, and a taper angle theta b of the first tapered seal part 40 is 5 degree, so that theta a is set to be larger. In order to stabilize the interface, it is desirable that the wall surfaces of the tapered seal parts have sufficiently good wettability. Under such condition, the width W1 of the second interface 51 is kept narrower than a width W2 of the first interface 52. The sizes of theta a and theta b may be other than the above-mentioned values. However, it is preferable for theta a to be about 15 to 50 degree and for theta b to be about 3 to 10 degree. When theta a and theta b are within those values, a good property can be attained.

In the second interface 51, the surfaces that make up the tapered seal part are moving relative to each other when the shaft body is rotating, unlike the first interface 52. The movement applies stress to the interface. However, the width W1 is structured to be relatively narrow, which prevents the interface from being disturbed by this stress, because the interface becomes stronger to disturbance as the width becomes narrower.

Figure 11:
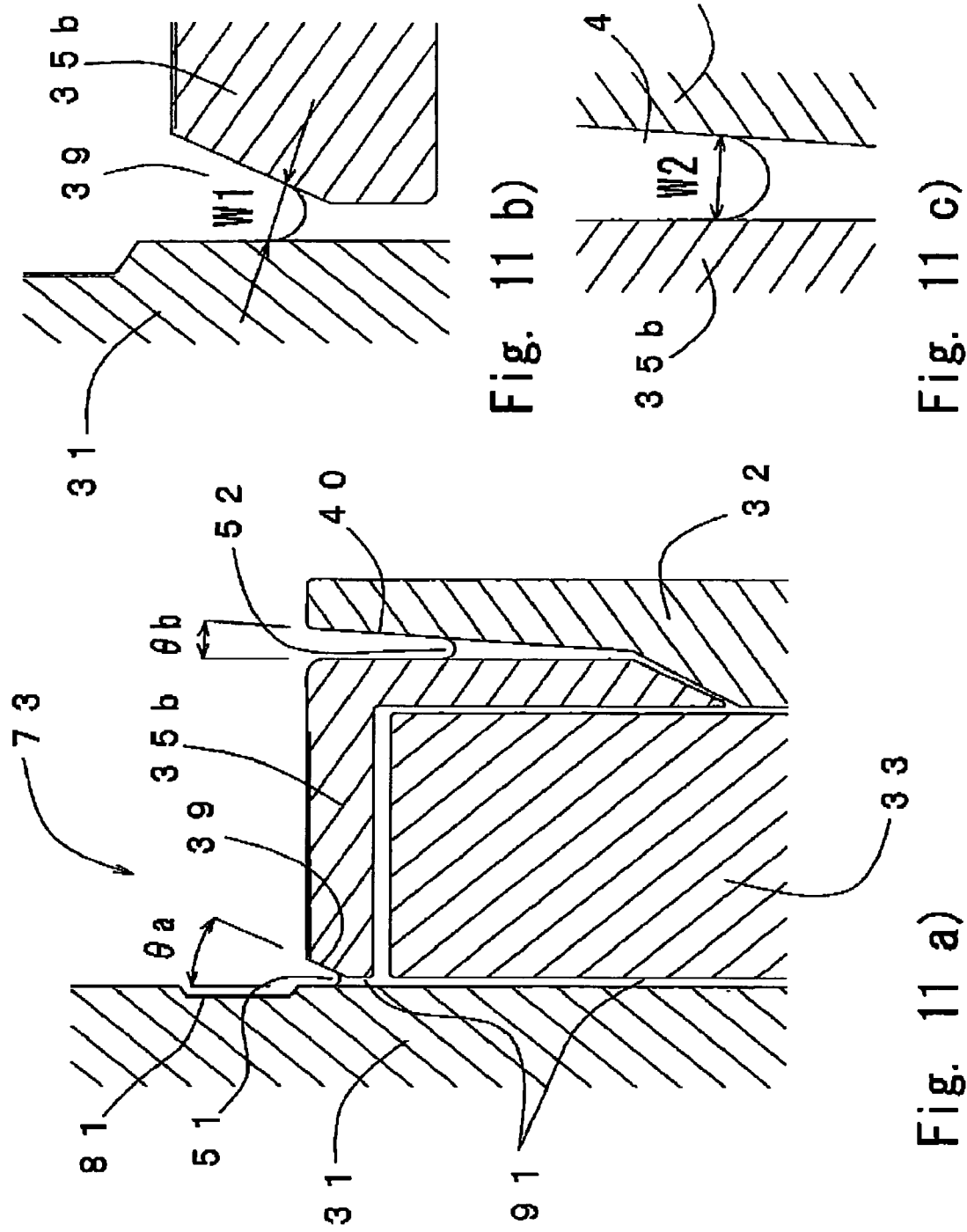
FIG. 11 shows a fourth modification of the bearing device.

The oil repellent film is applied outside of the second tapered seal part. In FIG. 11, the surfaces where the oil repellent film is applied are indicated by double line. In the outer peripheral surface of the shaft body 31, an annular concave portion 81 is fanned, and the oil repellent film is formed in this portion The effect of this concave portion is analogous to that of the inclined part in FIG. 7. The oil repellent film formed on a shaft body may be damaged by contact with the inner peripheral surface of the hole of the cover member. Such a problem can be avoided by forming a concave portion on the surface of a shaft body and forming the oil repellent film therein.

In FIG. 11, the oil repellent film on the surface of the cover member 35b is not applied inside of the radial gap (including the second tapered seal part 39). Furthermore, an end of the second interface 51 does not reach the portion to which the oil repellent film is applied.

In the bearing device 73, the outflow of the lubricating liquid from the radial gap is first inhibited by the second tapered seal part. The oil repellent film inhibits further movement toward the outside in the case where the interface is moved up to the vicinity of the opening part of the tapered seal part. It is also effective in preventing the lubricating liquid from diffusing through the wall surfaces and leaving out. Thus, because of guard by both the tapered seal and the oil repellent film, the bearing device 73 is stronger than the bearing device 3 of Embodiment 1 in the leakage of the lubricating liquid. However, a total height of the bearing increases by the height of the second tapered seal part. It is a little disadvantageous for miniaturization.

EMBODIMENT 5

Figure 12:
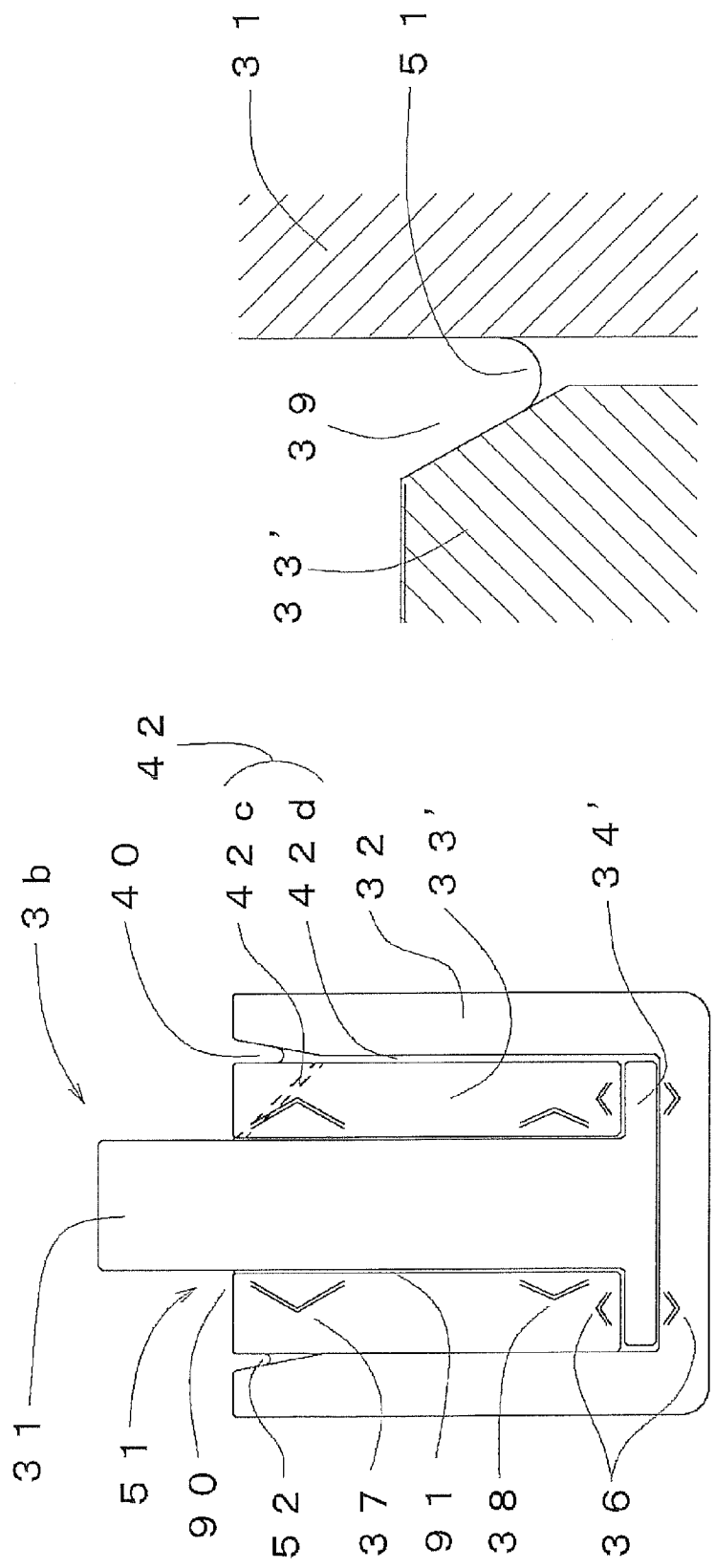
FIG. 12 illustrates another embodiment of the bearing device, wherein FIG. 12a) is a sectional view similar to FIG. 3a).
Figure 13:
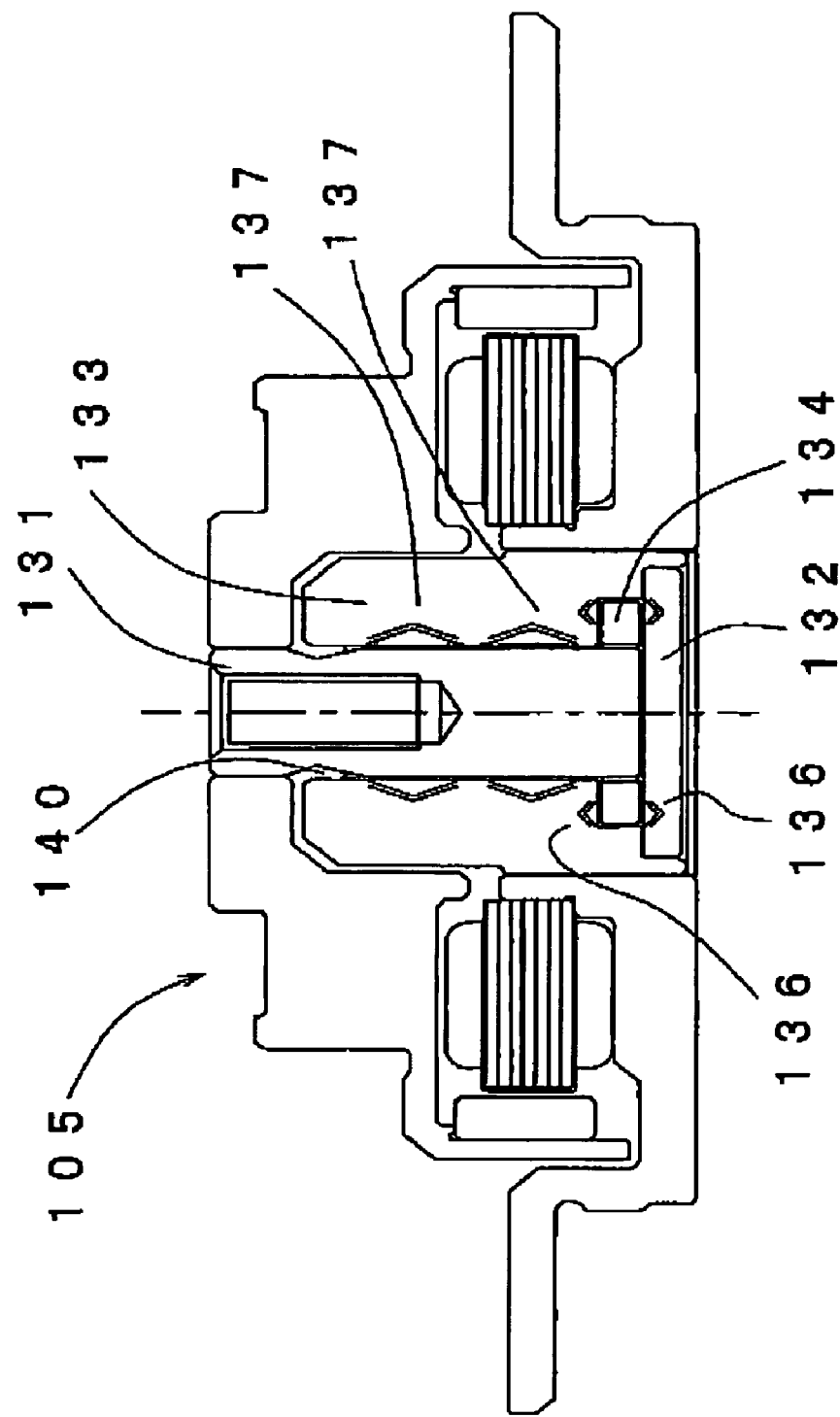
FIG. 13 shows a spindle motor mounting a conventional bearing device thereon.

Another embodiment 3b of the bearing device according to the present invention is described in reference to FIGS. 12a) and b).

Unlike the bearing device 3 as shown in FIG. 3, the bearing device 3b is not provided with the cover member 35. In FIG. 12a), an upper end part of a radial gap 91 connects through a connecting path 42c to a part where the first tapered seal part 40 is connected to the part of the communicating path 42d. In the upper end part of the radial gap 91, the second interface 51 forms in the second tapered seal part 39, as shown in FIG. 12b). In this case, without the cover member to bear the chamfer that makes the taper angle of the second tapered seal part 39 larger than that of the first tapered seal part 40, as indicated in FIG. 12b), the inner rim of a modified sleeve 33' is chamfered to form the appropriate taper angle of the second tapered seal part 39, wherein the second interface 51 forms likewise as in the FIG. 3 embodiment. A portion adjacent to the second interface 51 on the upper end surface of the sleeve 33' has the oil repellent film formed to make into an oil repellent region 90.

The radial dynamic pressure bearing mechanisms are formed at two positions away from each other in the axial direction. An upper end of the upper radial dynamic pressure bearing mechanism 37 reaches the vicinity of the upper end part of the radial gap 91. According to the present invention, in this manner, the radial dynamic pressure bearing mechanism 37 can be arranged sufficiently away from the lower radial dynamic pressure bearing mechanism 38. Since the interval between supporting points (at each point, the dynamic pressure is highest in each bearing mechanism) of the radial bearing is enlarged, rigidity against an external force applied in a direction inclining the shaft body is increased. Since the bearing device 3b, unlike the bearing device 3, has a structure not requiring the cover member 35, between supporting points of the radial bearing a span longer by the thickness of the cover member can be obtained.

The thickness of this cover member is not so significant in the case where a height of the bearing is comparatively large. However, with regard to the thin bearing with a low height on which the present invention particularly places importance, the thickness of the cover member has such influence that cannot be ignored. In such an application, the structure of the bearing device 3*b* is particularly useful.

The embodiments described above do not limit the embodiments of the present invention to themselves. For example, as a bearing mechanism on the thrust side, although only description of the thrust dynamic pressure bearing mechanism is given, this may be a dynamic pressure bearing mechanism using static pressure of the lubricating liquid in combination. Alternatively, the thrust plate may be omitted and point support at a shaft end may be employed. Furthermore, as a material, synthetic resin or the like can be freely used and the effects of the present invention are not lost by these changes.

What is claimed is:

1. A bearing device comprising:
   a shaft body;
   a stationary part;
   a bearing cavity which is formed in the stationary part, and is opened on one end side thereof to rotatably insert the shaft body therein;
   a first tapered seal part which is formed in the stationary part, and is opened at an end surface on the one end side of the stationary part to communicate to ambient air;
   a radial gap which is formed between an inner peripheral surface of the bearing cavity and a surface of the shaft body opposed to the inner peripheral surface of the bearing cavity;
   a radial dynamic pressure bearing mechanism comprising the outer peripheral surface of the shaft body as a bearing surface, and the inner peripheral surface of the bearing cavity as a bearing surface;
   a connecting path which is formed in the stationary part and connects the first tapered seal part and the radial gap;
   a communicating path being connected to the radial gap at two points to communicate the radial gap therethrough, the two points positioned axially apart to each other, at least a part of the radial dynamic pressure bearing mechanism located between the two points;
   a lubricating liquid which fills the radial gap, the connecting path, and the communicating path, substantially without interruption and fills up to the middle of the first tapered seal part;
   a first interface which is formed between the lubricating liquid and the ambient air in the first tapered seal part;
   a second interface which is formed between the lubricating liquid filling the radial gap and ambient air in an end surface on one end side of the radial gap, and is narrower in width than the first interface; and
   an oil repellent region formed on a surface of the stationary part adjacent to the ambient air side of the second interface, and on a peripheral surface of the shaft body adjacent to the ambient air side of the second interface.

2. The bearing device according to claim 1, wherein:
   the stationary part comprises a housing having a hole part opened on one end side and a sleeve fitted into, and fixed to the hole part;
   the bearing cavity is formed in the sleeve; and
   the first tapered seal part is made of an inner peripheral surface of the hole part and an outer peripheral surface of the sleeve in which spacing with the inner peripheral surface is enlarged toward to one end side thereof.

3. The bearing device according to claim 2, wherein:
   an end part on one end side of the radial gap is a second tapered seal part in which the clearance is enlarged toward the one end side;
   a taper angle of the second tapered seal part is larger than a taper angle of the first tapered seal part; and
   the second interface is formed in the second tapered seal part.

4. The bearing device according to claim 2, wherein an edge of the opening part of the bearing cavity is chamfered.

5. The bearing device according to claim 4, wherein a length in the shaft body direction of the chamfered portion is more than half a width of the second interface and less than a width of the first interface.

6. The bearing device according to claim 1, wherein:
   an end part on one end side of the radial gap is a second tapered seal part in which the clearance is enlarged toward the one end side;
   a taper angle of the second tapered seal part is larger than a taper angle of the first tapered seal part; and
   the second interface is formed in the second tapered seal part.

7. The bearing device according to claim 1, wherein an edge of the opening part of the bearing cavity is chamfered.

8. The bearing device according to claim 7, wherein a length in the shaft body direction of the chamfered portion is more than half a width of the second interface and less than a width of the first interface.

9. The bearing device according to claim 8, wherein in a surface of the chamfered portion, at least half on the outer side in a radial direction is in a part of the oil repellent region.

* * * * *